United States Patent
Froehlich et al.

(10) Patent No.: US 8,124,682 B2
(45) Date of Patent: Feb. 28, 2012

(54) RUBBER MIXTURE

(75) Inventors: Joachim Froehlich, Neumarkt (DE); Paul Dieter Messer, Bruehl (DE); Michael Warskulat, Bornheim (DE); Luis Molinari, Ravenna (IT); Vanni Vitali, Cesana (IT)

(73) Assignee: Evonik Carbon Black GmbH, Hanau (DE)

( * ) Notice: Subject to any disclaimer, the term of this patent is extended or adjusted under 35 U.S.C. 154(b) by 0 days.

(21) Appl. No.: 12/950,224

(22) Filed: Nov. 19, 2010

(65) Prior Publication Data
US 2011/0124792 A1    May 26, 2011

(30) Foreign Application Priority Data
Nov. 26, 2009 (DE) .......... 10 2009 047 175

(51) Int. Cl.
*C08K 3/04* (2006.01)

(52) U.S. Cl. ..... 524/496; 524/495; 524/847; 423/449.1; 423/445 R

(58) Field of Classification Search .......... 524/496, 524/495, 847; 423/449.1, 445 R
See application file for complete search history.

(56) References Cited

U.S. PATENT DOCUMENTS

| | | | |
|---|---|---|---|
| 4,138,471 | A | 2/1979 | Lamond et al. |
| 6,087,434 | A | 7/2000 | Hisashi et al. |
| 6,335,139 | B1 | 1/2002 | Gambayashi et al. |
| 6,440,628 | B1 | 8/2002 | Watanabe et al. |
| 6,599,496 | B2 | 7/2003 | Carter et al. |
| 2008/0110552 | A1* | 5/2008 | Arnold .......... 156/123 |
| 2008/0159947 | A1* | 7/2008 | Yurovskaya et al. ...... 423/449.2 |

FOREIGN PATENT DOCUMENTS

| | | |
|---|---|---|
| CA | 2078414 | 3/1993 |
| DE | 199 17 975 | 11/2000 |
| EP | 0 533 015 | 3/1993 |
| EP | 0 845 712 | 6/1998 |
| EP | 1 102 127 | 5/2001 |
| SU | 899589 | 1/1982 |
| WO | 03/021017 | 3/2003 |
| WO | 2008/058114 | 5/2008 |

OTHER PUBLICATIONS

"Directive 2005/69/EC of the European Parliament and of the Council of Nov. 16, 2005", Official Journal of the European Union, Sep. 12, 2005, pp. L323/51-L 323/54.
"Directives, Commission Directive 2007/19/WC of Mar. 30, 2007", Official Journal of the European Union, Mar. 31, 2007, pp. L 91/17-L 91/36.
Borm, PJ, et al., "Formation of PAH-DNA adducts after in vivo and vitro exposure of rats and lung cells to different commercial carbon blacks", Toxicology and Applied Pharmacology, Jun. 1, 2005, 205(2), pp. 157-167.
European Search Report dated May 5, 2011 for Application No. EP 10 18 8805 w/ partial English language translation.

\* cited by examiner

*Primary Examiner* — Ling-Siu Choi
(74) *Attorney, Agent, or Firm* — Smith, Gambrell & Russell, LLP

(57) ABSTRACT

The invention relates to a rubber mixture comprising at least one rubber and at least one low-PAH-content carbon black, where the low-PAH-content carbon black has
(A) an iodine number of from 17 to 75 mg/g,
(B) an STSA surface area of from 17 to 64 m$^2$/g,
(C) an iodine number:STSA surface area ratio >1.06 mg/m$^2$,
(D) an OAN number of from 60 to 160 ml/100 g,
(E) a COAN number of from 40 to 110 ml/100 g,
(F) a mode greater than 100 nm and
(G) benzo(a)pyrene content <2 ppm.
The rubber mixture can be used to produce technical rubber items and tyres.

10 Claims, No Drawings

RUBBER MIXTURE

The invention relates to a rubber mixture.

Rubber mixtures usually comprise reinforcing fillers to improve the mechanical properties of the elastomer products produced therefrom. Industrially produced carbon blacks are very often used as reinforcing filler. Carbon blacks are produced industrially via pyrolysis of hydrocarbons at high temperatures under controlled process conditions. Under these conditions, traces of polycyclic aromatic hydrocarbons ("polyaromatic hydrocarbons", also termed PAHs) form on the surface of the carbon black.

Some PAHs are potentially hazardous to health. Although PAHs in carbon blacks are firmly bound on the surface of the carbon black and do not therefore have biological availability (Borm P J, et al., *Formation of PAH-DNA adducts after in vivo and vitro exposure of rats and lung cells to different commercial carbon blacks*, Toxicology and Applied Pharmacology, 2005 Jun. 1; 205(2): 157-167), the EU authorities, and also users, are making efforts to reduce PAH content in industrially produced carbon blacks. Examples here are:

- EU Directive 2007/19/EC, which deals with the regulations for plastics and articles which come into contact with foods. The directive prescribes an upper limit for the benzo(a)pyrene content of carbon black: 0.25 mg/kg. Before the said directive came into force, there was no upper PAH limit for carbon blacks.
- EU Directive 2005/69/EC, which deals with the content of PAHs in extender oils for producing tyres. The said directive does not directly regulate the PAH content of carbon blacks; however, the EU's aim in restricting the PAH content of extender oils for use in tyre production was to reduce the total annual emissions of PAHs in accordance with the POP Protocol under the UNECE Convention on Long-Range Transboundary Air. Pollution (CLRTAP) of 1998.

These examples show that there is a general trend toward reduction of the PAH content of polymeric materials and therefore also of rubber mixtures. Accordingly, there is also a general trend toward reduction of the PAH content of the ingredients used in the said materials, e.g. of carbon blacks. One of the guideline variables used for the PAH content of carbon blacks is the content of benzo(a)pyrene—hereinafter also abbreviated to BaP.

PAH content can to some extent be influenced before the production process is completed, for example in the reactor in the case of furnace blacks. PAH contents can be reduced from, for example, 100-150 ppm to 25-40 ppm by using high temperatures and/or delayed quenching (U.S. Pat. No. 4,138,471).

However, if particularly low PAH contents cannot be achieved via the method of operating the reactor, the carbon blacks can be post-treated to remove PAHs that are present. It is known that the level of polycondensed aromatic hydrocarbons on carbon black is reduced via thermal treatment of pelletized furnace black in a fluidized bed in the presence of at least 10% of oxygen (U.S. Pat. No. 4,138,471). The amounts that can be achieved for the compounds benzo(a)pyrene, dibenz(a,h)anthracene or 7,12-dimethylbenz(a)anthracene are respectively less than 2 ppb.

It is also known that the amount of polycondensed aromatic hydrocarbons on carbon nanomaterials can be reduced via extraction with a solvent (WO 03/021017).

There is also a known toner (U.S. Pat. No. 6,440,628) which comprises inter alia carbon black with PAH content of less than 10 ppm, based on naphthalene, acenaphthylene, acenaphthene, fluorene, phenanthrene, anthracene, fluoranthene, pyrene, benzo(a)anthracene, chrysene, benzo(b)fluoranthene, benzo(a)pyrene, benzo(k,j)fluoranthene, dibenzo(a,h)anthracene, indeno(1,2,3-cd)pyrene and benzo(g,h,l)perylene.

There are also known rubber mixtures comprising a carbon black with a specific surface area of from 13 to 19 $m^2/g$ and from 0.25 to 0.28% by weight of polycondensed aromatic hydrocarbons (SU 899589) and, respectively, a carbon black with a specific surface area of from 50 to 57 $m^2/g$ and from 0.21 to 0.23% by weight of polyaromatic hydrocarbons (SU 899589).

There is also a toner disclosed in EP 1102127 and comprising a carbon black with less than 15 ppm content of PAHs, examples being compounds such as benzopyrene, anthracene-benzopyrene, phenanthrene, pyrene and the like.

U.S. Pat. No. 6,087,434 moreover discloses a pigment preparation which comprises a carbon black with less than 10 ppm content of PAHs, examples being compounds such as naphthalene, fluorene, fluoranthene, pyrene, chrysene, benzopyrene and the like, and with specific oxygen content of from 0.2 to 0.4 $mg/m^2$.

There are also medical contrast agents disclosed in U.S. Pat. No. 6,599,496 which comprise a carbon pigment, the PAH content of which is stated to be below 0.5 ppm.

WO 2008/058114 describes carbon blacks, the PAH content of which could be lowered via heat treatment or extraction to values of from 1 to 20 ppm or to values $\leq 10$ ppm.

Although, on the one hand, there is rising demand for rubber mixtures with ingredients which have reduced PAH content, it is also necessary on the other hand to ensure that the said rubber mixtures do not lead to qualitative disadvantages in use, for example in terms of mechanical properties or of the dispersion performance of the filler that they comprise. It is therefore desirable to provide rubber mixtures with low-PAH-content carbon blacks, where these do not have performance disadvantages in comparison with rubber mixtures comprising the carbon blacks normally available.

It is an object of the present to provide a rubber mixture which comprises a low-PAH-content carbon black and which simultaneously, when compared with a standard carbon black without lowered PAH content, has improved dispersion properties and good final properties when the vulcanized rubber is used.

The invention provides a rubber mixture comprising at least one rubber and at least one low-RAH-content carbon black, which is characterized in that the low-PAH-content carbon black has (A) an iodine number of from 17 to 75 mg/g, preferably from 35 to 70 mg/g, particularly preferably from 40 to 55 mg/g, (B) an STSA surface area of from 17 to 64 $m^2/g$, preferably from 36 to 64 $m^2/g$, particularly preferably from 36 to 50 $m^2/g$, (C) an iodine number:STSA surface area ratio >1.06 $mg/m^2$, preferably >1.08 $mg/m^2$, particularly preferably >1.12 $mg/m^2$, extremely preferably >1.15 $mg/m^2$, (D) an OAN number of from 60 to 160 ml/100 g, preferably from 70 to 140 ml/100 g, particularly preferably from 110 to 132 ml/100 g, (E) a COAN number of from 40 to 110 ml/100 g, preferably from 60 to 100 ml/100 g, particularly preferably from 70 to 95 ml/100 g, (F) a mode greater than 100 nm, preferably greater than 150 nm, particularly preferably greater than 160 nm, and (G) benzo(a)pyrene content <2 ppm, preferably <1 ppm, particularly preferably <0.5 ppm, very particularly preferably <0.1 ppm, extremely preferably <0.05 ppm.

The rubber used in the rubber mixtures according to the invention can comprise not only natural rubber but also synthetic rubbers. Preferred synthetic rubbers are described by way of example by W. Hofmann, Kautschuktechnologie [Rubber technology], Genter Verlag, Stuttgard 1980. They encompass inter alia polybutadiene (BR),
polyisoprene (IR),
styrene/butadiene copolymers, for example emulsion SBR (ESBR) or solution SBR (SSBR), preferably having styrene content of from 1 to 60% by weight, particularly preferably from 2 to 50% by weight, based on the entire polymer,
chloroprene (CR),
isobutylene/isoprene copolymers (IIR), and also halogenated variants,
butadiene/acrylonitrile copolymers, preferably having acrylonitrile content of from 5 to 60% by weight, preferably from 10 to 50% by weight, based on the entire polymer (NBR),
partially or fully hydrogenated NBR rubber (HNBR),
ethylene/propylene/diene copolymers (EPDM),
ethylene/propylene copolymers (EPM),
fluoro rubber (FKM, FPM),
acrylate rubber (ACM),
silicone rubber (Q),
chlorosulphonated polyethylene (CSM),
ethylene-vinyl acetate copolymers (EVM),
abovementioned rubbers which additionally possess functional groups, e.g. carboxy, silanol, or epoxy groups, examples being epoxidized NR, carboxy-functionalized NBR or silanol- (—SiOH)— or siloxy-functionalized (—Si—OR) SBR, and also mixtures of the said rubbers.

The rubber mixtures according to the invention can preferably comprise natural rubber or SBR rubber and, if appropriate, mixtures with diene rubbers.

The rubber mixtures according to the invention for use in lorry tyre treads can comprise natural rubber or else a mixture thereof with diene rubbers.

The rubber mixtures according to the invention for use in car tyre treads can comprise SBR rubber, or else a mixture thereof with other diene rubbers.

The rubber mixtures according to the invention for use as components for tyre subcomponents can comprise SBR rubber, butadiene rubber or natural rubber, or else a mixture of these with other diene rubbers.

The rubber mixtures according to the invention for use in profiles can comprise EPD(M) rubber, or else a mixture thereof with other rubbers.

The amounts that can be used of the low-PAH-content carbon black can be from 10 to 300 phr (parts per hundred rubber), preferably from 20 to 200 phr, particularly preferably from 30 to 160 phr, very particularly preferably from 30 to 100 phr, based on the entire amount of rubber used.

Iodine number is measured to ASTM D1510.
STSA surface area is measured to ASTM D6556.
OAN number is measured to ASTM D2414, using the following parameters: oil: paraffin, endpoint-determination method: procedure A.
COAN number is measured to ASTM D3493-06, using the following parameter: oil: paraffin.
Mode is calculated from the cumulative size distribution.
Cumulative size distribution here is determined to the standard ISO 15825, first edition, 1 Nov. 2004, but using the following modifications:

Supplement to section 4.6.3 of the ISO 15825 standard: The mode relates to the curve of distribution by mass (mass distribution curve).

Supplement to section 5.1 of the ISO 15825 standard: The equipment used comprises a BI-DCP Particle Sizer with associated dcplw32 evaluation software, Version 3.81, all of which is obtainable from Brookhaven Instruments Corporation, 750 Blue Point Rd., Holtsville, N.Y., 11742.

Supplement to section 5.2 of the ISO 15825 standard: The equipment used comprises a GM2200 ultrasound control unit, a UW2200 acoustic transducer, and a DH13G sonotrode. The ultrasound control unit, acoustic transducer, and sonotrode are obtainable from Bandelin electronic GmbH & Co. KG, Heinrichstrasse 3-4, D-12207 Berlin. The values set here on the ultrasound control unit are as follows: Power %=50, Cycle=8. This corresponds to a nominal power level set at 100 watts and to pulse levels set at 80%.

Supplement to section 5.2.1 of the ISO 15825 standard: Ultrasound time is set at 4.5 minutes.

The definition given in section 6.3 of the ISO 15825 standard is varied by defining "surfactant" as follows: "surfactant" is Nonidet P 40 Substitute, which is an anionic surfactant from Fluka, obtainable from Sigma-Aldrich Chemie GmbH, Industriestrasse 25, CH-9471 Buchs SG, Switzerland.

The definition of spin fluid given in section 6.5 of the ISO 15825 standard is varied by defining spin fluid as follows: The spin fluid is produced by taking 0.25 g of Nonidet P 40 Substitute surfactant from Fluka (section 6.3) and making this up to 1000 ml with demineralized water (section 6.1). The pH of the solution is then adjusted to from 9 to 10 by using 0.1 mol/l NaOH solution. The spin fluid has to be used at most 1 week after it has been produced.

The definition of dispersion fluid given in section 6.6 of the ISO 15825 standard is varied by defining dispersion fluid as follows: The dispersion fluid is produced by taking 200 ml of ethanol (section 6.2) and 0.5 g of Nonidet P 40 Substitute surfactant from Fluka (section 6.3) and making this up to 1000 ml with demineralized water (section 6.1). The pH of the solution is then adjusted to from 9 to 10 by using 0.1 mol/l NaOH solution. The dispersion fluid has to be used at most 1 week after it has been produced.

Supplement to section 7 of the ISO 15825 standard: The material used is exclusively pelletized carbon black.

The instructions in sections 8.1, 8.2, and 8.3 of the ISO 15825 standard are together replaced by the following instruction: The pelletized carbon black is gently crushed in an agate mortar. 20 ml of dispersion solution (section 6.6) are then admixed with 20 mg of carbon black in a 30 ml beaded-rim bottle (diameter 28 mm, height 75 mm, wall thickness 1.0 mm) and treated with ultrasound (section 5.2) in a cooling bath (16° C.+/−1° C.) for a period of 4.5 minutes (section 5.2.1) so that the carbon black becomes suspended in the dispersion solution. After the ultrasound treatment, the specimen is measured in the centrifuge within a period of 5 minutes.

Supplement to section 9 of the ISO 15825 standard: The carbon black density value to be entered is 1.86 g/cm$^3$. The temperature for the temperature to be entered is determined in accordance with section 10.11. The option "aqueous" is selected for spin-fluid type. This gives a value of 0.997 (g/cc) for spin-fluid density and a value of 0.917 (cP) for spin-fluid viscosity. The light-scattering correction is applied by using options selectable in the dcplw 32 software: file=carbon.prm; Mie correction.

Supplement to section 10.1 of the ISO 15825 standard: Centrifuge speed is set to 11 000 r/min.

Supplement to section 10.2 of the ISO 15825 standard: 0-85 cm³ of ethanol (section 6-2) is injected instead of 0.2 cm³ of ethanol (section 6.2).

Supplement to section 10.3 of the ISO 15825 standard: Exactly 15 cm³ of spin fluid (section 6.5) are injected. 0.15 cm³ of ethanol (section 6.2) is then injected.

The instruction in section 10.4 of the ISO 15825 standard is omitted completely.

Supplement to section 10.7 of the ISO 15825 standard: Immediately after the start of data recording, the spin fluid in the centrifuge is covered with 0.1 cm³ of dodecane (section 6.4).

Supplement to section 10.10 of the ISO 15825 standard: If the measurement curve does not return to the baseline within a period of one hour, the measurement is terminated after precisely 1 hour of measurement time, rather than restarting with a different centrifuge-rotation rate.

Supplement to section 10.11 of the ISO 15825 standard: Instead of using the method described in the instructions for determining the measurement temperature, the measurement temperature T to be entered into the computer program is determined as follows:

$$T=\tfrac{2}{3}(Te-Ta)+Ta,$$

where Ta is the temperature of the measurement chamber prior to measurement and Te is the temperature of the measurement chamber after measurement. The temperature difference should not exceed 4° C.

Benzo(a)pyrene (BaP) content here is determined by the following method, which describes the determination of a total of 22 PAHs: "Determination of PAH content of carbon black; Docket No. 95F-0163; date: 8 Jul. 1994; method submitted by Cabot Corporation, 75 State Street, Boston, Mass.; obtainable from the Office of Premarket Approval Center for Food Safety and Applied Nutrition (HFS-200), Food and Drug Administration, 200 C Street S.W., Washington, D.C. 20204".

Transmittance at wavelength 300 nm here can be >45% and <98%, preferably >45% and <95%, particularly preferably >45% and <90%.

Transmittance at wavelength 300 nm is determined to ASTM D1618-04, but evaluating at wavelength 300 nm instead of the usual 425 nm.

The low-PAH-content carbon black can be a gas black, lamp black, plasma black, thermal black or preferably furnace black.

The low-PAH-content carbon black can be non-surface-modified and non-post-treated.

The pH of the low-PAH-content carbon black can be >5, preferably >8.

The pH here is determined to ASTM D1512.

The rubber mixture according to the invention can comprise silica, preferably precipitated silica.

The rubber mixture according to the invention can comprise organosilanes, for example bis(triethoxysilylpropyl) polysulphide or (mercaptoorganyl)alkoxysilanes.

The rubber mixture according to the invention can comprise rubber auxiliaries.

The rubber mixture according to the invention can comprise further rubber auxiliaries, e.g. reaction accelerators, antioxidants, heat stabilizers, light stabilizer, antiozonants, processing aids, plasticizers, tackifiers, blowing agents, dyes, pigments, waxes, extenders, organic acids, retarders, metal oxides, and also activators, such as diphenylguanidine, triethanolamine, polyethylene glycol, alkoxy-terminated polyethylene glycol or hexanetriol, these being known to the rubber industry.

The amounts used of the rubber auxiliaries can be the usual amounts, which depend inter alia on the intended use. Examples of usual amounts can be amounts of from 0.1 to 50 phr, based on rubber.

Crosslinking agents that can be used are sulphur, organic sulphur donors or free-radical generators.

The rubber mixtures according to the invention can moreover comprise vulcanization accelerators.

Examples of suitable vulcanization accelerators can be mercaptobenzothiazoles, sulphenamides, guanidines, thiurams, dithiocarbamates, thioureas and thiocarbonates.

Amounts that can be used of the vulcanization accelerators and crosslinking agents are from 0.1 to 10 phr, preferably from 0.1 to 5 phr, based on rubber.

The blending of the rubbers with the filler, and if appropriate with rubber auxiliaries, and if appropriate with the organosilanes, can be conducted in or on conventional mixing assemblies, such as rolls, internal mixers, and mixing extruders. Rubber mixtures of this type can usually be produced in an internal mixer, beginning with one or more successive thermomechanical mixing stages in which the following are incorporated: the rubbers, the carbon black, if appropriate the silica, and if appropriate the organosilanes, and the rubber auxiliaries, at from 100 to 180° C. The sequence of addition and the juncture of addition of the individual components can have a decisive effect here on the properties obtained from the mixture. The crosslinking chemicals can then usually be admixed with the resultant rubber mixture in an internal mixer or on a roll system at from 40 to 130° C., preferably from 50 to 120° C., the mixture then being processed to give what is known as the crude mixture for the process steps that follow, examples being shaping and vulcanization.

The vulcanization of the rubber mixtures of the invention can take place at temperatures of from 80 to 230° C., preferably from 130 to 200° C., if appropriate under pressure of from 10 to 200 bar.

The rubber mixtures according to the invention can be used to produce mouldings or extrudates, for example for producing pneumatic or other tyres, tyre treads, cable sheathing, hoses, drive belts, conveyor belts, roll coverings, shoe soles, ring seals, profiles and damping elements.

An advantage of the rubber mixture according to the invention is that on the one hand it comprises a low-PAH-content carbon black as ingredient, but on the other hand it has good mechanical properties and, respectively, leads to excellent performance characteristics in the finished vulcanizate. The rubber mixture according to the invention moreover exhibits very good dispersion of the low-PAH-content carbon black.

EXAMPLES

Table 1 lists the properties found from analysis of the carbon blacks used.

TABLE 1

| | | Carbon black | |
|---|---|---|---|
| | | Carbon black A | Carbon black B |
| Iodine number | mg/g | 42.6 | 43.8 |
| STSA | m²/g | 40.1 | 37.6 |
| Iodine number/ STSA | mg/m² | 1.06 | 1.16 |
| OAN | ml/100 g | 119.0 | 124.5 |
| COAN | ml/100 g | 83.9 | 82.2 |
| Transmittance, 300 nm | % | 26.3 | 85.0 |

TABLE 1-continued

|  |  | Carbon black | |
| --- | --- | --- | --- |
|  |  | Carbon black A | Carbon black B |
| Mode | nm | 162 | 171 |
| Benzo(a)pyrene | ppm | 2.83 | 0.03 |

Carbon black A is Corax ® N 550 from Evonik Degussa GmbH.
Carbon black B is EB542RP from Evonik Degussa GmbH.

Example 1

Rubber Mixture Based on Natural Rubber

Table 2 below states the formulation used for the natural rubber mixtures. The unit phr here means parts by weight, based on 100 parts of the crude rubber used.

The general process for producing rubber mixtures and vulcanizates of these is described in the following book: "Rubber Technology Handbook", W. Hofmann, Hanser Verlag 1994.

TABLE 2

|  | phr |
| --- | --- |
| Stage 1 | |
| SMR 10 ML4 = 60-70 | 100.0 |
| Carbon black | 52.0 |
| Stearic acid | 3.0 |
| ZnO | 3.0 |
| Vulkanox ® 4020 | 1.0 |
| Vulkanox ® HS | 1.0 |
| Protektor ® G3108 | 1.0 |
| Stage 2 | |
| Stage 1 batch | |
| Sulphur | 1.5 |
| Rhenogran ® TBBS-80 | 1.2 |

Vulkanox ® 4020 is the antioxidant 6PPD from Lanxess AG.
Vulkanox ® HS is the antioxidant TMQ from Lanxess AG.
Protektor ® G3108 is an antiozonant wax from Paramelt B.V. Rhenogran ® TBBS-80 is a vulcanization accelerator of TBBS type, comprising 80% of active ingredient, from Rhein-Chemie GmbH.

The natural rubber SMR10 mL4=60-70 is SMR10 which is masticated on a roll mill by the usual methods prior to the incorporation-by-mixing process, with at least 24 hours, but at most 1 week, of intermediate storage at room temperature after the mastication process. The ML 1+4 (100° C.) value for this masticated SMR10 is in the range from 60 to 70. The ML 1+4 value is measured to DIN 53523/3.

The rubber mixtures are produced in an internal mixer in compliance with the mixing specification in Table 3.

TABLE 3

| Stage 1 Settings | |
| --- | --- |
| Mixing assembly | Werner and Pfleiderer GK 1,5N |
| Rotation rate | 65 rpm |
| Ram pressure | 5.5 bar |
| Capacity | 1.6 l |
| Fill level | 0.70 |
| Chamber temperature | 70° C. |
| Mixing procedure | |
| 0 to 1 min | Natural rubber |
| 1 to 2 min | ½ of carbon black |
| 2 to 5 min | ½ of carbon black, stearic acid, ZnO, Vulkanox, Protektor |
| 5 min | Purge |
| 5 to 6 min | Mix and discharge |
| Batch temperature | 145-155° C. |
| Storage | 24 h at room temperature |
| Stage 2 Settings | |
| Mixing assembly | Werner and Pfleiderer GK 1,5N |
| Rotation rate | 40 rpm |
| Ram pressure | 5.5 bar |
| Capacity | 1.6 l |
| Fill level | 0.68 |
| Chamber temperature. | 60° C. |
| Mixing procedure | |
| 0 to 2 min | Stage 1 batch, sulphur, TBBS-80 |
| Batch temperature | 100-110° C. |
| 2 min | Discharge and form milled sheet on Troester WNU 1 laboratory roll mill (diameter 150 mm, length 350 mm, roll temperature 40/50° C., 17/21 rpm) Homogenize.: Cut the material and fold it over 3 times towards the left and 3 times towards the right, and roll the material 3 times with wide roll gap (6 mm) and 3 times with narrow roll gap (3 mm), and then draw off milled sheet. |
| Batch temperature | <110° C. |

Table 4 collates the methods for testing of vulcanized rubber.

TABLE 4

| Physical testing/conditions | Standard |
| --- | --- |
| Ring tensile test 1/specimen 2, 23° C. Tensile strength (MPa) Modulus at 100% elongation (MPa) Modulus at 300% elongation (MPa) Elongation at break (%) | DIN 53504, ISO 37 |
| Goodrich flexometer test, 0.175 inch displacement, 2 h, 23° C. Needle temperature (° C.) | DIN 53533, ASTM D623 A |
| Shore hardness, 23° C. Shore A | DIN 53505 |

Method for Determining Dispersion:

Coefficient of dispersion is determined by means of surface topography, inclusive of Medalia correction ([A. Wehmeier, "Filler Dispersion analysis by Topography Measurements" Technical Report TR 820, Degussa AG, Advanced Fillers and Pigments Division], ["Entwicklung eines Verfahrens zur Charakterisierung der Füllstoffdispersion in Gummimischungen mittels einer Oberflächentopographie" [Development of a surface-topography method for characterizing filler dispersion in vulcanized rubber mixtures] A. Wehmeier; degree thesis, 1998, at the Münster University of Applied Sciences, Steinfurt site, Chemical Engineering Department], and also [Patent Application DE19917975]). The coefficient of dispersion that can be determined by the said method correlates with coefficient of determination >0.95 with the coefficient of dispersion determined by optical methods, for example as determined by the Deutsches Institut für Kautschuktechnologie e.V., Hanover, Germany (H. Geisler, "Bestimmung der Mischgüte" [Determination of mixing quality], presented at the DIK-Workshop [Workshop of the German Institute of Rubber Technology], 27-28 Nov. 1997, Hanover, Germany). However, in the present case it is not the coefficient of dispersion that is stated, but instead the peak area (in %) likewise described in the said method. The better the dispersion here, the smaller the peak area.

Table 5 shows the results of vulcanizate testing in natural rubber. The vulcanization time for the mixtures is 15 minutes, at 150° C.

TABLE 5

|  |  | Rubber mixture | |
|---|---|---|---|
|  |  | Comparative rubber mixture 1 | Rubber mixture 1 according to the invention |
| Rubber mixture comprising |  | Carbon black A | Carbon black B |
| Ring tensile test 1 |  |  |  |
| Tensile strength | MPa | 20.0 | 18.9 |
| 100% modulus | MPa | 2.6 | 2.6 |
| 300% modulus | MPa | 13.6 | 13.3 |
| Elongation at break | % | 456 | 437 |
| Shore A hardness | — | 61 | 62 |
| Viscoelastic properties |  |  |  |
| Goodrich flexometer, 0.175 inch/2 h, needle temperature | °C. | 70 | 67 |
| Dispersion |  |  |  |
| Peak area | % | 2.3 | 0.8 |

The vulcanizate data in Table 5 show that the performance-characteristic profile of rubber mixture 1 according to the invention, which comprises the low-PAH-content carbon black, is comparable with that of comparative rubber mixture 1, which comprises a standard carbon black. Dispersion has moreover been improved in rubber mixture 1 according to the invention, as indicated by the smaller peak area.

Example 2

Rubber Mixture Based on EPDM

Table 6 below states the formulation used for the EPDM mixtures.

TABLE 6

| Stage 1 | |
|---|---|
| Buna ® EP G 5455 | 150 |
| Carbon black | 130 |
| Stearic acid | 2 |
| ZnO | 5 |
| Lipoxol ® 4000 | 2 |
| Sunpar 150 | 50 |
| Stage 2 | |
| Vulkacit ® Merkapto C | 1 |
| Rhenocure ® TP/S | 2 |
| Ground sulphur | 1.5 |
| Perkacit TBZTD-PDR-D |  |

Buna ® EP G 5455 is an EPDM rubber from Lanxess AG, extended with 50 phr of paraffinic oil.
Lipoxol ® 4000 is polyethylene glycol of molar mass 4000 g/mol, obtainable from Sasol Deutschland GmbH.
Sunpar 150 is a paraffinic mineral process oil from Sun Oil Company.

The vulcanization accelerator Vulkacit® Merkapto C is MBT, obtainable from Lanxess AG. The vulcanization accelerator Rhenocure® TP/S is zinc dibutyl dithiophosphate (ZDDP), obtainable from RheinChemie. The vulcanization accelerator Perkacit TBZTD-PDR-D is TBZTD from Flexsys N.V.

The rubber mixtures are produced in an internal mixer in compliance with the mixing specification in Table 7.

TABLE 7

| Stage 1 Settings | |
|---|---|
| Mixing assembly | Werner and Pfleiderer GK 1,5E |
| Rotation rate | 40 rpm |
| Ram pressure | 5.5 bar |
| Capacity | 1.58 l |
| Fill level | 0.55 |
| Chamber temperature | 50° C. |
| Mixing procedure | |
| 0 to 1 min | Polymer |
| 1 to 3 min | Carbon black, ZnO, stearic acid, Lipoxol, Sunpar 150 |
| 3 min | Purge |
| 3 to 4 min | Mix and discharge |
| Batch temperature | 80-120° C. |
| Storage | 24 h at room temperature |
| Stage 2 Settings | |
| Mixing assembly | Werner and Pfleiderer GK 1,5E |
| Rotation rate | 40 rpm |
| Ram pressure | 5.5 bar |
| Capacity | 1.58 l |
| Fill level | 0.53 |
| Chamber temperature | 50° C. |
| Mixing procedure | |
| 0 to 1 min | Stage 1 batch |
| 1 to 2 min | Accelerator, sulphur |
| 2 min | Discharge and form milled sheet on Troester WNU 1 laboratory roll mill (diameter 150 mm, length 350 mm, roll temperature 40/50° C., 17/21 rpm) Homogenize: Cut the material and fold it over 3 times towards the left and 3 times towards the right, and roll the material 6 times with wide roll gap (6 mm) and 6 times with narrow roll gap (3 mm), and then draw off milled sheet. |
| Batch temperature | <110° C. |

Table 8 shows the results of vulcanizate testing. The vulcanization time for the mixtures is 10 minutes, at 170° C.

TABLE 8

|  |  | Rubber mixture | |
|---|---|---|---|
|  |  | Comparative rubber mixture 2 | Rubber mixture 2 according to the invention |
| Rubber mixture comprising |  | Carbon black A | Carbon black B |
| Tensile test on specimen 2 |  |  |  |
| Tensile strength | MPa | 14.5 | 13.2 |
| 100% modulus | MPa | 4.3 | 3.8 |
| 300% modulus | MPa | 11.4 | 9.4 |
| Elongation at break | % | 417 | 441 |
| Shore A hardness | — | 63 | 61 |
| Dispersion |  |  |  |
| Peak area | % | 5.2 | 0.4 |

The vulcanizate data in Table 8 show that the performance-characteristic profile of rubber mixture 2 according to the invention, which comprises the low-PAH-content carbon black, is comparable with that of comparative rubber mixture 2, which comprises a standard carbon black. Dispersion has moreover been improved in rubber mixture 2 according to the invention, as indicated by the smaller peak area.

The invention claimed is:

1. A rubber mixture comprising at least one rubber and at least one low-PAH-content carbon black, characterized in that the low-PAH-content carbon black has
   (A) an iodine number of from 17 to 75 mg/g,
   (B) an STSA surface area of from 17 to 64 m$^2$/g,
   (C) an iodine number:STSA surface area ratio >1.06 mg/m$^2$,
   (D) an OAN number of from 60 to 160 ml/100 g,
   (E) a COAN number of from 40 to 110 ml/100 g,
   (F) a mode greater than 100 nm and
   (G) benzo(a)pyrene content <2 ppm.

2. The rubber mixture according to claim 1, wherein the benzo(a)pyrene content of the low-PAH-content carbon black is <1 ppm.

3. The rubber mixture according to claim 1, wherein the benzo(a)pyrene content of the low-PAH-content carbon black is <0.5 ppm.

4. The rubber mixture according to claim 1, wherein the benzo(a)pyrene content of the low-PAH-content carbon black is <0.1 ppm.

5. The rubber mixture according to claim 1, wherein the STSA surface area of the low-PAH-content carbon black is from 36 to 64 m$^2$/g.

6. The rubber mixture according to claim 5, wherein the STSA surface area of the low-PAH-content carbon black is from 36 to 50 m$^2$/g.

7. The rubber mixture according to claim 5, wherein the transmittance of the low-PAH-content carbon black at 300 nm is >45% and <98%.

8. The rubber mixture according to claim 7, wherein the transmittance of the low-PAH-content carbon black at 300 nm is >45% and <95%.

9. The rubber mixture according to claim 7, wherein the transmittance of the low-PAH-content carbon black at 300 nm is >45% and <90%.

10. A method of producing rubber items or tires, comprising:
    processing a rubber mixture according to claim 1 to form a rubber item or tire.

* * * * *